Patented July 3, 1934

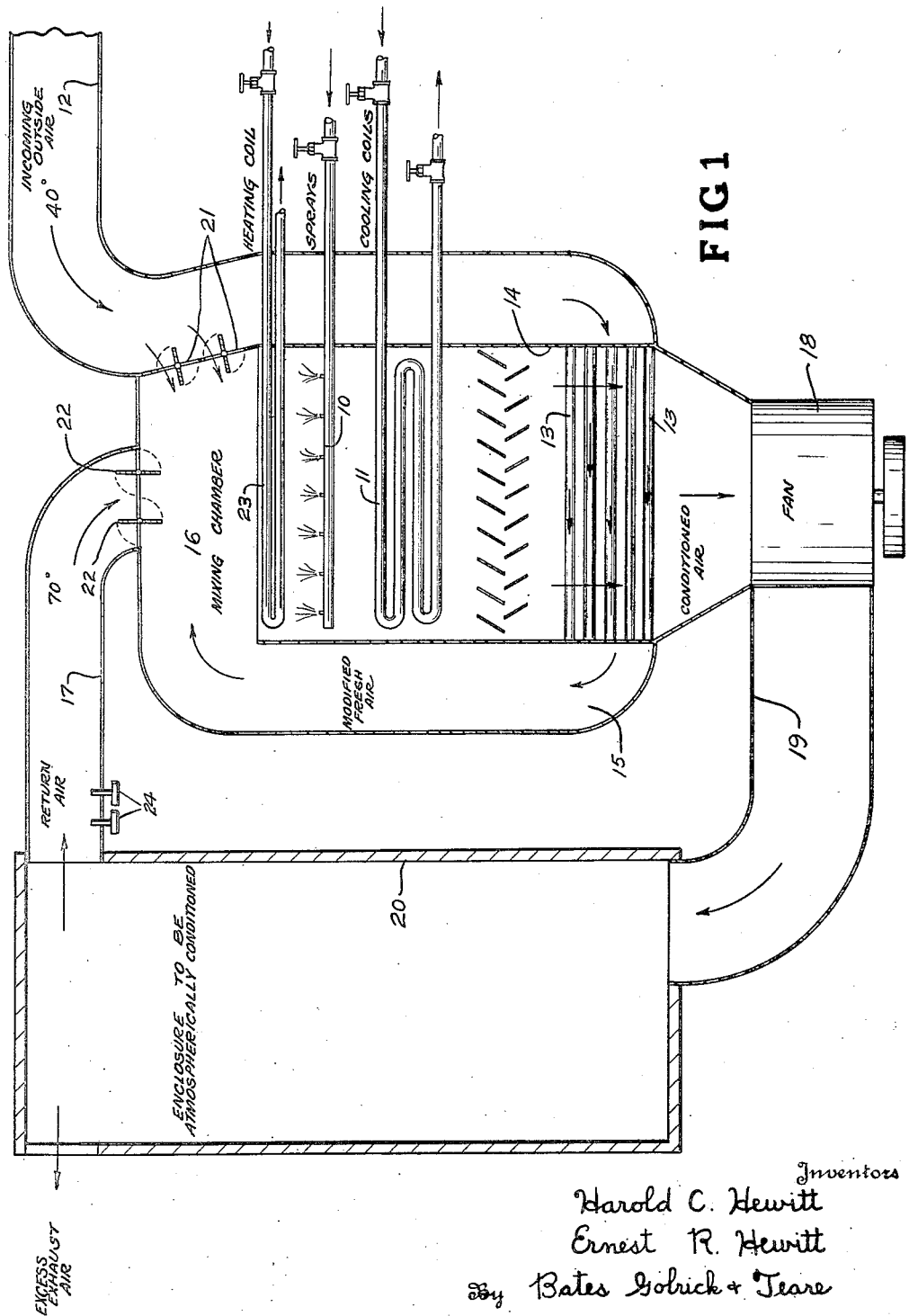

1,965,078

UNITED STATES PATENT OFFICE 1,965,078

AIR CONDITIONING SYSTEM

Harold C. Hewitt, Cleveland, and Ernest E. Hewitt, Salem, Ohio

Application October 12, 1931, Serial No. 568,410

5 Claims. (Cl. 257—9)

This invention relates to a method and apparatus for conditioning air and is especially applicable for use in theaters, auditoriums, mercantile establishments and the like. Where such systems are used for cooling purposes, it has been a difficult problem to control the humidity in an economical manner. One system has attempted to reduce the maintenance operation, by passing some of the exhaust air around the treating equipment and recirculating it with the treated incoming air. This method is objectionable however, for all of the air in circulation is not subjected to a washing operation. In fact, about fifty-percent of the air so entering the auditorium is unwashed. Thus, objectionable odors and impurities, which may be present in the returned or exhausted air are continuously recirculated.

Another system, which forms the basis of an application by Lloyd Jones and Harold C. Hewitt, which application bears Serial No. 498,623 and a filing date of November 28, 1930, has sought to overcome the objection incident to the use of unwashed air by utilizing the exhaust air for cooling the condenser coils of the refrigeration apparatus, and thereafter utilizing the heated exhaust air for conditioning the humidity of the ingoing air, without intermingling therewith. This system however, requires a refrigerating capacity of approximately fifty-percent more than the above mentioned by-pass system, and is therefore, materially higher in the initial investment and operating cost.

The principal object of the present invention is to provide a system, wherein all of the air flowing into the auditorium or building is washed and treated, and wherein the refrigerating capacity may remain substantially identical with that utilized for the by-pass system. An additional object of our invention is to provide apparatus, which can readily be applied to existing equipment in an economical manner.

Referring now to the drawing, the figure illustrates diagrammatically a system embodying our invention. Briefly, our invention comprises the usual washing and refrigerating units, which are illustrated diagrammatically at 10 and 11, through which all of the air entering the building or room to be treated is caused to flow. Part of the exhausted outside air is recirculated and is intermingled with the incoming air prior to its passage through the washing and cooling equipment.

After the air passes through the washing apparatus, it is approximately at the due point or saturated with moisture so that it is necsssary to correct the humidity by increasing the dry bulb temperature without changing the moisture content of the air before it is allowed to enter the auditorium. We correct humidity by adding heat transferred from the incoming outside air without causing a direct intermingling thereof. This operation precools the incoming outside air and thereby materially reduces the expense of operation. This procedure may best be understood from an inspection of Fig. 1, wherein the arrows indicate the entrance of the incoming outside air through a conduit 12, and thence through a heat interchange device 13, that is illustrated as a bank of tubes, which are disposed across the conduit 14, that houses the air conditioning and treating equipment. As the washed and cooled saturated air flows crosswise of the interchanger tubes, it takes up heat from the incoming outside air flowing within the tubes and thereby increases the dry bulb temperature of the washed and cooled air resulting in a lower relative humidity of the air so treated. After the incoming outside air passes through the interchanger 13, where it has been precooled it flows through a conduit 15 and thence into a mixing chamber 16, where it intermingles with the exhausted air flowing in conduit 17, and passes with it through the washing and cooling or dehumidifying equipment over the interchanger 13, and thence through a blower 18, conduit 19 and building or room 20 to be treated.

If desired, all of the incoming outside air may be passed through the heat interchange device, or some of it may be introduced directly through dampers 21 directly into the mixing chamber 16, depending upon the variations in atmospheric conditions from time to time. Such dampers, as well as dampers 22 in the exhaust conduit 17, may be automatically controlled. The temperature and humidity control devices 24 are shown in conduit 17. These devices are actuated by the fluctuations and humidity of the return air.

An example of the operation of a system embodying our invention can best be understood by consideration of an auditorium or enclosure, wherein it is desired to circulate 60,000-cubic feet of air per minute. We will consider an application of this type having a total heat load of 12,000-B. t. u. and a total evaporation load of 4.3 lbs. water vapor per minute, with thirty percent of the total air coming from outside the building, and seventy percent of the total air being returned from the auditorium to be recirculated with the incoming outside air; estimating the outside atmospheric conditions equivalent to 95 deg. F and 39% relative humidity, with inside atmospheric conditions to be 80 deg. F and 55% relative humidity. Under such conditions, it is necessary to introduce into the auditorium, 4322 pounds of conditioned air, which is made up of 3028 pounds of return air at 80 degrees and 55% relative humidity, also 1300-pounds of outside air at 95 degrees and 39% relative humidity. In order to absorb the heat and evaporation load in the auditorium, this 4322 pounds of conditioned air must be sufficiently cooled and dehumidified before it is introduced into the enclosure. As the entire quantity of air passes through the air conditioned, it is washed, cooled and dehumidified to the proper dew point or moisture content, so as to absorb or evaporate the moisture to be taken from the auditorium or enclosure. In dehumidifying this air, it is necessary to cool below the desired dry bulb temperature, therefore, some heat must be introduced to increase the temperature to the proper degree before the air can be introduced into the auditorium. With this present invention, this heat is introduced by passing the cool saturated air over the heat exchangers, while the warm outside air is flowing through the tubes. The heat transferred between these two quantities of air at different temperature conditions is sufficient for raising the dry bulb temperature of the cooled air and conditioning it before it is introduced into the auditorium or enclosure.

The amount of heat transferred through the exchangers in this case is 10,891-B. t. u. and the temperature of the outside air is reduced, thereby the cooling and dehumidifying work is materially lessened, notwithstanding the fact that the incoming outside air is caused to pass completely through the entire air conditioning equipment where it is washed and cleaned after intermingling with the return air which is recirculated. Under such conditions, the cooling and dehumidifying load is equivalent to 109 tons of refrigerating effect. After the air leaves the washer and cooling or dehumidifying apparatus, it is at a temperature of approximately 60.2 degrees F. with 100% relative humidity, and as it passes over the heat exchangers it takes up sufficient heat from the outside air to raise the dry bulb temperature and lower the relative humidity so when this air is introduced into the auditorium, it is properly conditioned.

It is apparent that our invention possesses valuable operating advantages, for it utilizes the heat of the incoming outside air for tempering and humidity correction. The removal of this heat from the incoming outside air before it intermingles with the return air lessens the amount of work, otherwise required for cooling and dehumidifying within the washer and cooling apparatus.

In the wintertime, this invention will utilize the heating coils (23) which provide heat for heating the air before it passes through the washer and humidifying apparatus. Then by passing this heated and humidified air over the heat interchanger (13), superfluous moisture is condensed from the air, resulting in a corrected humidity condition, before it is introduced into the building or enclosure. Preheating of the incoming outside air is accomplished as this air is flowing through the interchanger tubes (13), extracting heat from the heated humidified air which passes over the tubes, thereby eliminating the necessity of installing additional preheating coils otherwise required. Automatic corrections for atmospheric changes or temperature fluctuations will be provided by means of the temperature controls (24) in conduit (17) which actuate the dampers (21) and (22) to regulate the quantity and mixture of air flowing through the apparatus.

We claim:

1. A method of introducing fresh air into a return circulatory system, including passing some outside air through the system whereby a heat exchange occurs between the outside air and the air in the system, then introducing the modified outside air into the system at a point in advance of that where the heat exchange occurs, and washing the air in the system between the point where the outside air enters and where the heat exchange occurs.

2. A method of controlling the humidity of air flowing into a room, comprising building up a circulatory system, washing and changing the temperature of the air in the system, causing a moving current of outside air to flow crosswise of the system, whereby an interchange of heat occurs between the incoming air and treated air, and then causing the modified incoming air to enter the system in advance of the position of the washing operation.

3. A method of controlling the humidity of air flowing into a room, comprising setting up an air circulatory system, washing and cooling the air in the system, and introducing outside air into the system on the intake side of the washing position, and precooling the incoming air by moving it in close proximity to the treated air without intermingling therewith, and before it is introduced into the system.

4. An air conditioning system, comprising in combination, a conduit, means for treating air in the conduit, means for introducing fresh air into the conduit on one side of said means, said conduit being adapted to convey some of the fresh air transversely of and through the system, whereby an interchange of heat occurs between the fresh air and the treated air, means for by-passing some of the fresh air into the system in advance of the treating means, and mechanism for automatically controlling the operation of said last-named means so as to maintain a substantially uniform humidity of the treated air.

5. An air circulatory system, comprising a circulatory conduit for return air, an outside air conduit extending through and enveloping part of the circulatory conduit, whereby an exchange of heat occurs between the air in said conduit and means for by-passing some of the air from the outside air conduit into the circulatory conduit.

HAROLD C. HEWITT.
ERNEST R. HEWITT.